United States Patent [19]

Mehrotra et al.

[11] Patent Number: 5,370,716
[45] Date of Patent: Dec. 6, 1994

[54] HIGH Z SIALON AND CUTTING TOOLS MADE THEREFROM AND METHOD OF USING

[75] Inventors: Pankaj K. Mehrotra, Greensburg; Joyce L. Swiokla, Export; Robert D. Nixon, Greensburg, all of Pa.

[73] Assignee: Kennametal Inc., Latrobe, Pa.

[21] Appl. No.: 983,986

[22] Filed: Nov. 30, 1992

[51] Int. Cl.⁵ .............................................. C04B 35/58
[52] U.S. Cl. ....................................... 51/293; 51/295; 51/307; 501/98
[58] Field of Search ................... 51/293, 295, 308, 309, 51/307; 501/98

[56] References Cited

U.S. PATENT DOCUMENTS

| | | | |
|---|---|---|---|
| Re. 32,343 | 1/1989 | Wei | 501/98 |
| 3,991,148 | 11/1976 | Lumby et al. | 264/56 |
| 3,991,166 | 11/1976 | Jack et al. | 423/327 |
| 4,127,416 | 11/1978 | Lumby et al. | 106/73.2 |
| 4,147,759 | 4/1979 | Demit | 423/327 |
| 4,184,884 | 1/1980 | Jong | 106/73.2 |
| 4,323,323 | 4/1972 | Lumby et al. | 407/119 |
| 4,547,470 | 10/1985 | Tanase et al. | 501/87 |
| 4,711,644 | 12/1987 | Yeckley et al. | 51/307 |
| 4,789,277 | 12/1988 | Rhodes et al. | 409/131 |
| 4,818,635 | 4/1989 | Ekstrom et al. | 501/97 |
| 4,826,791 | 5/1989 | Mehrotra et al. | 501/89 |
| 4,880,755 | 11/1989 | Mehrotra et al. | 51/309 |
| 4,900,700 | 2/1990 | Jun et al. | 501/78 |
| 4,946,807 | 8/1990 | Okuno et al. | 501/89 |
| 4,961,757 | 10/1990 | Rhodes et al. | 51/309 |

OTHER PUBLICATIONS

Evans & Chareles, "Fracture Toughness Determination by Indentation," J. Amer. Ceramic Soc., vol. 59, No. 7–8. pp. 371, 372. no date.

"Kennametal Tooling Applications Program," Kennametal Inc., (1990), pp. 3–7, 39–42. no month.

American National Standard for Cutting Tools–indexable inserts–identification system, ANSI B212.4–1986, pp. 4–8, American National Standards Institute, Inc., New York, NY. No date.

*Primary Examiner*—Karl Group
*Attorney, Agent, or Firm*—John J. Prizzi

[57] ABSTRACT

A ceramic material for use as a cutting tool in the high speed machining of high temperature alloys and cast irons is provided with a composition of beta prime sialon ($Si_{6-z}Al_zO_zN_{8-z}$; where $1<Z<3$) and intergranular phase. The material has high wear resistance and reliability when used in the high speed machining of high temperature alloys at speeds of 300 to 1500 surface feet per minute.

63 Claims, 6 Drawing Sheets

HIGH Z SIALON AND CUTTING TOOLS MADE THEREFROM AND METHOD OF USING

BACKGROUND OF THE INVENTION

The present invention relates to sialon compositions, especially those that are used as cutting tools for the machining of metallic materials.

Cutting tools with high wear resistance and reliability are critical to improving productivity in the high speed machining of high temperature alloys. High temperature alloys (or superalloys) are generally classified as having poor machinability. Consequently, they are machined at speeds that are typically only 10 to 20 percent of those used for steel when using cemented carbide tools. High temperature alloy machining speeds can be significantly increased, however, by employing silicon nitride, sialon (U.S. Pat. Nos. 4,711,644; 3,991,166; 4,818,635) or silicon carbide whisker reinforced alumina tools (U.S. Pat. Nos. Re. 45,196; 4,789,277 and 4,961,757). Of these, the silicon carbide whisker reinforced alumina tools provide the highest wear resistance but are the most expensive due to the high cost of silicon carbide whiskers, and the fabrication technique required to manufacture these tools, i.e. hot pressing (as opposed to cold pressing and then sintering). Ceramic cutting tools containing sialon typically include beta prime sialon ($Si_{6-z}Al_zO_zN_{8-z}$) and intergranular phases, or beta prime plus alpha prime sialon [$(Si,Al)_{12}M_X(O,N)_{16}$ where X is between 0.1 and 2 and M can be Li, Ca, Mg, Hf, Zr, Ce, Y, Sc or other lanthanides] and intergranular phases. The value of Z for beta prime sialon may be greater than zero but less than 4.2; however, all commercial grades of sialon based (i.e., containing 50 v/o or more sialon) cutting tools have had Z values significantly below 1.0 since it is believed that the toughness of sialons deteriorates as the value of Z increases.

Black ceramics ($Al_2O_3$+TiC) and some white ceramics ($Al_2O_3$ and $Al_2O_3$+$ZrO_2$) also show excellent wear resistance in these applications, but suffer from poor reliability.

Therefore, there is a need for an economical ceramic tool material with a combination of high wear resistance and toughness in high speed machining of high temperature alloys. Similarly, there is also a need for an economical ceramic material with a combination of high wear resistance and toughness in the machining of cast irons, hardened cast irons and hardened steels.

BRIEF SUMMARY OF THE INVENTION

A new ceramic material has been surprisingly discovered to have significantly enhanced wear resistance and toughness in the high speed machining of high temperature alloys. It has been found that this new ceramic material, which is composed of beta prime sialon and a glassy phase, can provide performance similar to or better than that of silicon carbide whisker reinforced alumina in high speed machining of high temperature alloys under various machining conditions. A significant and unexpected advantage of this new material is that it combines high wear resistance and fracture resistance in metalcutting with low cost, since it does not utilize SiC whiskers and does not require hot pressing for fabrication. The cutting tools made of this material may be made by the less expensive cold pressing and sintering route. It is believed that this material may also be advantageously used in the machining of cast irons and steels.

In accordance with the present invention, a ceramic metalcutting insert is provided for high speed (i.e. at least 300 surface feet per minute) chip forming machining of high temperature alloys. The cutting tool has a flank face, a rake face, and a cutting edge formed at the juncture of the rake face and flank face. The ceramic material has sialon grains and an intergranular phase disposed between the sialon grains. Preferably at least 70, and more preferably, at least 85 volume percent (v/o) of the sialon is beta prime sialon ($Si_{6-z}Al_zO_zN_{8-z}$), having a Z value greater than 1.0 but less than 3.0. Preferably Z has a value above about 1.5, and more preferably, above 1.7. The material is believe to have excellent thermal shock resistance during metalcutting.

Preferably, the material has a Young's Modulus, E, of less than 285 GPa, and more preferably, less than 270 GPa. Preferably, the $K_{Ic}$(E&C) fracture toughness is between 4.0 and 6.0 $MPam^{\frac{1}{2}}$, and more preferably, between about 4.6 and about 5.7 $MPam^{1/8}$.

Also, in accordance with the present invention a method of high speed machining of high temperature alloys is provided which utilizes the ceramic cutting insert described above at a speed of 300 to 1500 surface feet per minute. Preferred speeds within this range are 500 to 1200 and 300 to 800 surface feet per minute for finishing and roughing, respectively. Preferably a feed rate of 0.001 to 0.008 inches/revolution is used in finishing. Preferably a feed rate of 0.005 to 0.018 inches/revolution is used in roughing.

These and other aspects of the present invention will become more clear upon review of the drawings, which are briefly described below, in conjunction with the following detailed description of the invention.

DETAILED DESCRIPTION OF THE INVENTION

Figure 1:
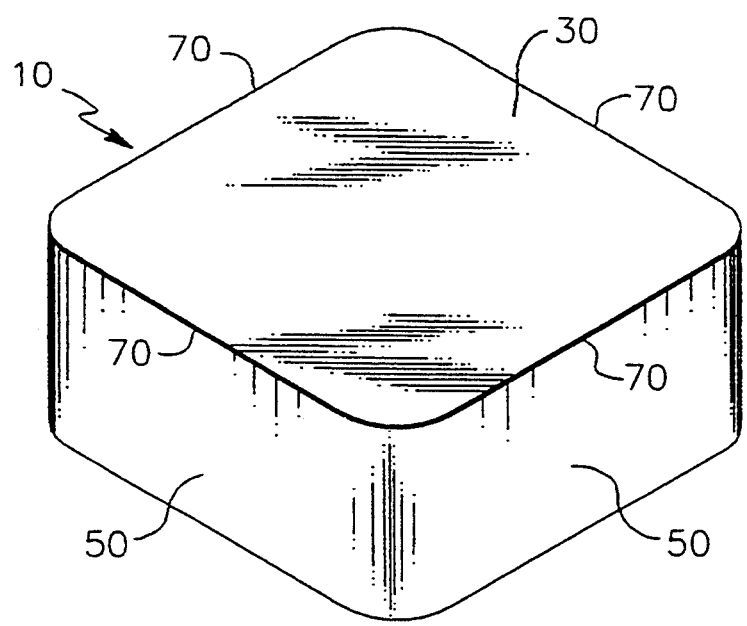
FIG. 1 shows an embodiment of a cutting insert in accordance with the present invention.

In accordance with the present invention, FIG. 1 shows a preferred embodiment of an indexable ceramic metalcutting insert 10 composed of the ceramic material discovered by the present inventors. The metalcutting insert 10 is preferably used in the high speed chip forming machining (e.g. turning, milling, grooving and threading) of high temperature alloys such as: the nickel base alloys—Inconel 625, Inconel 718 and Incoloy 901 and the iron base alloy Incoloy 909; the cobalt base alloys-MAR-M-509 and MAR-M-247; powder metal alloys—Rene 95 and IN-100; as well as Stellite and Hastelloy. This material may also be used in the high speed machining of cast irons (e.g., grey iron), and the machining of hardened steels and hardened cast irons. The metalcutting insert has a rake face 30 over which chips, formed during high speed machining of high temperature alloys, cast irons or steels, flow. Joined to the rake surface 30 are flank faces 50. At the juncture of the rake face and the flank faces 50 is formed a cutting edge 70, for cutting into the high temperature alloys, cast irons or steels, at high speeds. The cutting edge 70 may be in either a honed, chamfered or chamfered and honed condition. The hone may be any of the style or sizes of hones used in the industry. One particular style that has been found to provide good results in many applications is a 0.001 to 0.002 inch radius hone. Alternatively, the cutting edge 70 may have a chamfer (i.e., T-land) of 0.003 inch X 20°. This chamfer may be used alone or combined with a hone.

The metalcutting insert described above is composed of the ceramic composition in accordance with the present invention. This composition has a microstructure of sialon grains having an intergranular phase or phases disposed between the sialon grains. Sialon phase, or phases, forms at least 50 v/o of the entire ceramic composition. At least 70 v/o percent of the sialon is beta prime sialon and preferably 85 v/o of the sialon is beta prime sialon, and more preferably, 100 v/o of the sialon is beta prime sialon.

Figure 2:
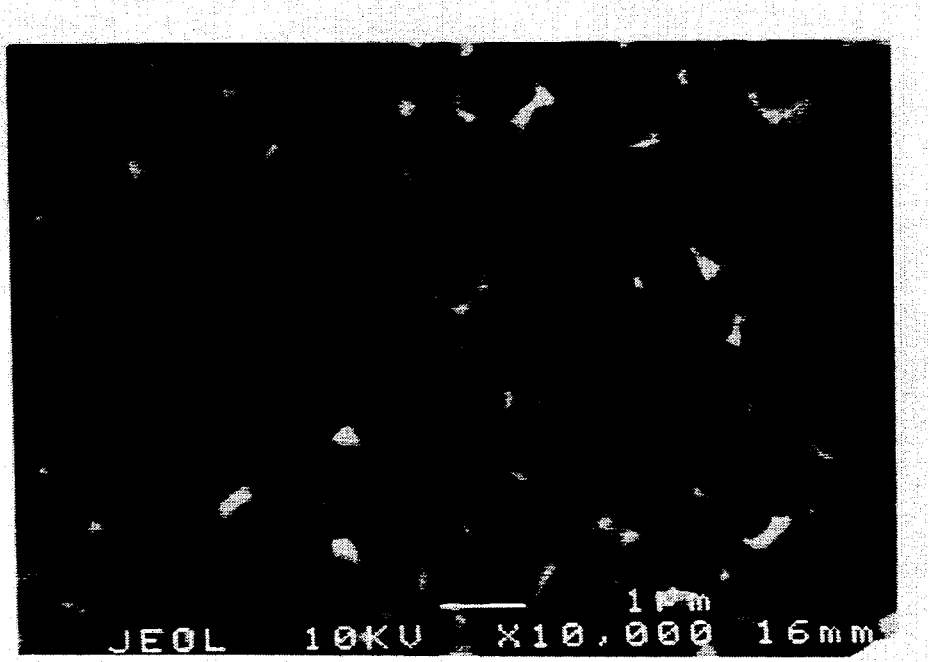
FIG. 2 shows a typical microstructure of a sialon material in accordance with the present invention at 10,000×.

The intergranular phase is preferably noncrystalline, but may also contain minor amounts of crystalline phases such as YAG (yttrium aluminum garnet) Y-N-α-Wollastonite, YAM, N-YAM. The intergranular phase(s) is a product of the sintering aid used. The range of intergranular phase in the composition is 1.0 to 15 v/o with about 5 to 15 v/o percent being preferred. Above about 15 v/o the noncrystalline intergranular phase may reduce high temperatures deformation resistance and thermal conductivity to an unacceptable degree. The sintering aid used to produce the intergranular phase may be selected from the oxides of lithium, calcium, magnesium, zirconium, hafnium, cerium, yttrium, scandium, lanthanum or one of the other members of the lanthanide series. Of the elements listed above, yttrium is preferred, since it has a highly refractory oxide which produces high melting point glasses with silica and alumina present in the material, thereby allowing the product to be used at higher temperatures than would be possible with lower temperature glasses. The presence of yttria in the sintering mixture has also been found to result in products with high density and strength without the application of pressure during sintering. In order to provide optimum cutting performance, the material should have less than one percent porosity, and preferably be fully dense. In the examples that immediately follow, quantitative metallography was utilized to characterize the volume percent of intergranular phase in materials having Z equal to about 2 and in which the sialon was 100% beta prime. In the two lots which were analyzed, the average volume percent of intergranular phase was about 11 and 12 volume percent, with standard deviations of about 3.1 and 1.2, respectively. A typical microstructure is shown in FIG. 2. The light or white phase is intergranular phase, whereas the dark phase is sialon. X-ray diffraction patterns of representative material in accordance with the present invention were unable to detect any crystalline intergranular phases.

Returning now to a discussion of the sialon phases in the present invention, it should be noted that while it is preferred that the sialon be 100% beta prime sialon, small amounts of other sialon phases may also be present. These other sialon phases include polytype phases (see Ekstrom U.S. Pat. No. 4,818,635) at a level of less than 5 v/o of the total sialon present. Alpha prime sialon while improving wear resistance, because of its high hardness, has an adverse effect on toughness and, therefore, if present, should only be present at a level of up to 30 v/o of the total sialon and, more preferably, less than 15 v/o.

In an alternative embodiment of the present invention, small amounts of refractory phases, preferably no greater than 30 v/o, and more preferably less than 15 v/o, may be added to our composition. The amount that may be added is limited in that, while these phases may increase the wear resistance of our material, their high thermal expansion coefficient is likely to reduce its thermal shock resistance. The refractory materials that may be used include one or more of TiN, TiCN, TiC, HfN, HfCN, HfC, ZrN, ZrCN and ZrC. Of these compounds, TiN and ZrN are preferred.

Figure 3:
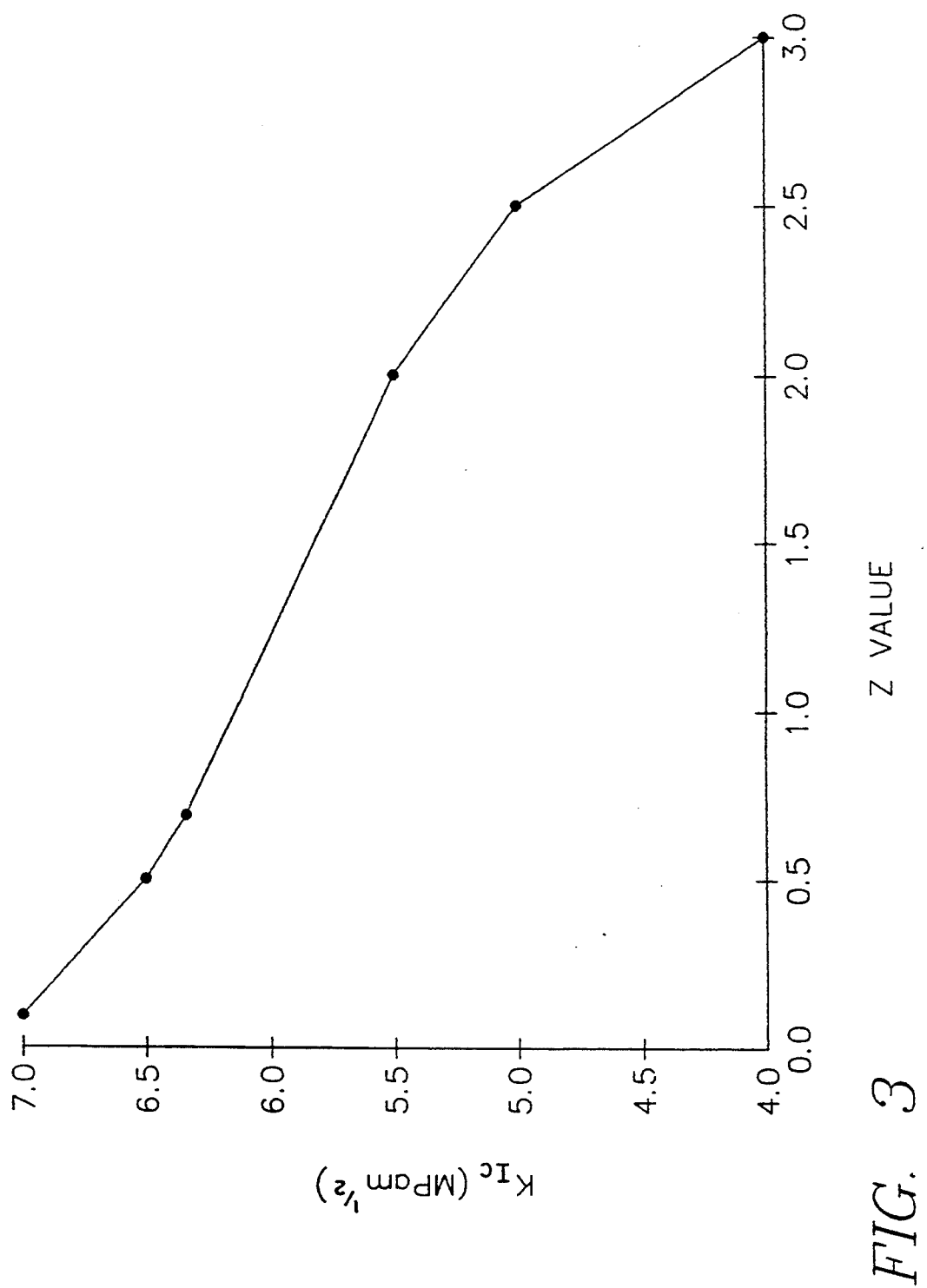
FIG. 3 is a graph of $K_{Ic}$ (E&C) fracture toughness as a function of Z value.

The beta prime sialon present in our composition forms at least 70 v/o and preferably all of the sialon present in the composition and has the formula $Si_{6-z}Al_zO_zN_{8-z}$, where Z is greater than 1, but less than 3. As noted in the background of the invention, all commercial grades of sialon based cutting tools prior to the present invention had Z value well below 1, based on the belief that increasing Z values results in decreased toughness ($K_{Ic}$(E&C)). The present applicants have verified this belief by testing samples containing sialon and intergranular phase (at a constant $Y_2O_3$ addition of 4.7 w/o), having varying Z values from about 0.1 to 3.0. FIG. 3 which shows the results of these tests, indicating that $K_{Ic}$(E&C) fracture toughness decreases continuously from a high of 7 MPam$^{\frac{1}{2}}$ at Z≈0.1 to a low of about 4.0 MPam$^{\frac{1}{2}}$ at Z≈3.0. Based in part on this information, it is preferable to maintain the Z value of the present invention no higher than 2.5, and more preferably at 2.3 or lower.

Figure 4:
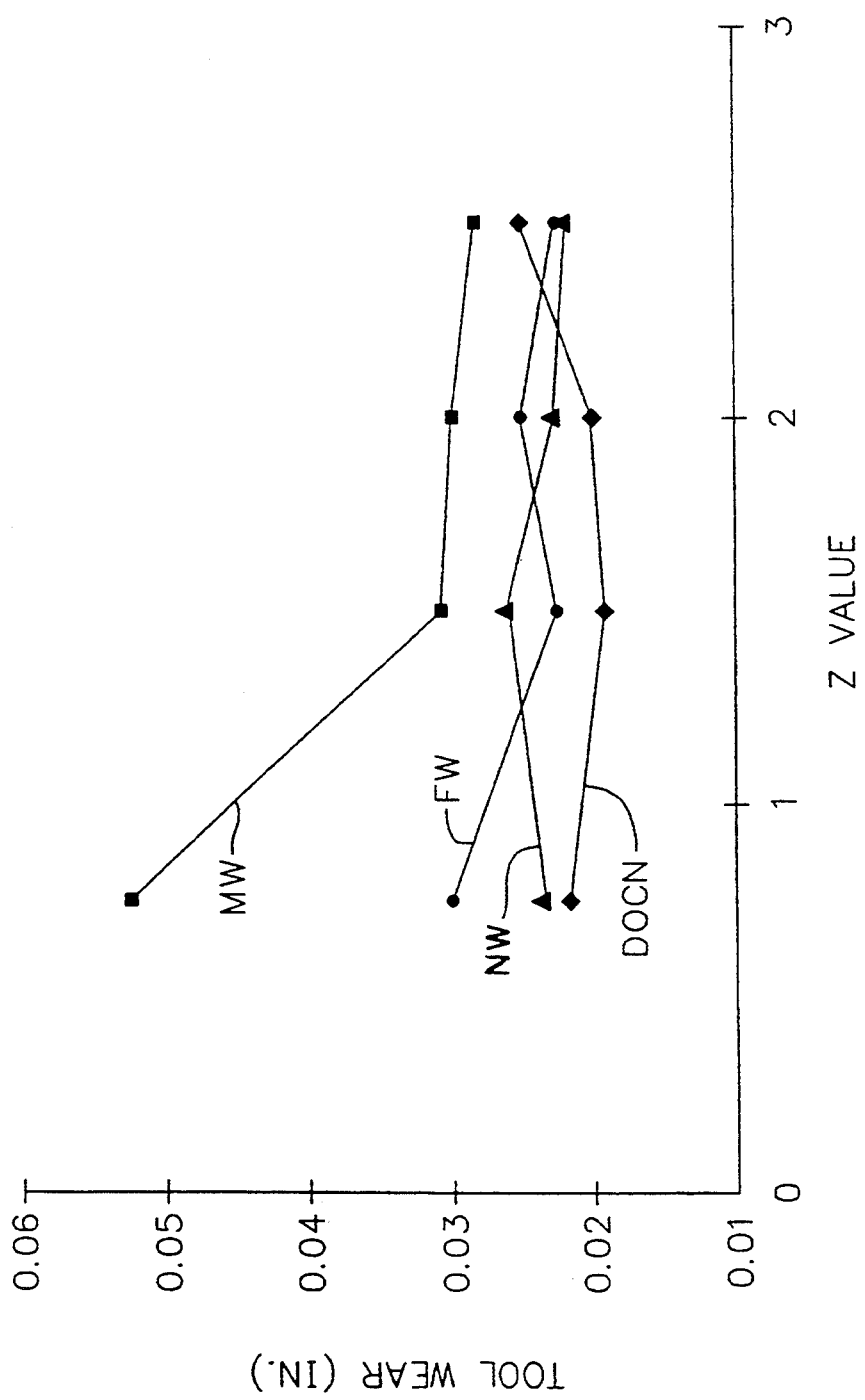
FIG. 4 is a graph of tool wear as a function of the Z value of beta prime sialon, while machining Inconel 718 having a Rockwell C hardness of 34.

However, applicants have found that while ceramics having beta prime sialon with a Z value of less than 1 have high toughness, and make reliable cutting tools, they have relatively poor wear resistance in the high speed machining of high temperature alloys. This is demonstrated by FIG. 4 which shows tool wear in inches as a function of the estimated Z value of ceramic cutting tools composed of beta prime sialon and intergranular phase. The material machined by turning was Inconel 718 having a Rockwell C hardness of 34. The test conditions were: 800 surface feet per minute; 0.008 inch per revolution feed rate; 0.06 inch depth of cut; and time was 5 minutes. As can be seen in FIG. 4, the limiting wear factor is maximum flank wear (MW). It can also be seen from FIG. 4 that maximum flank wear resistance seems to degrade significantly at a Z value of about 1 or lower. It is, therefore, critical to the present invention that Z be above 1, preferably above about 1.5 and more preferably above 1.7 in order to provide assurance of the best wear resistance during high speed machining of high temperature alloys. The other wear mechanisms noted in FIG. 4 are flank wear (FW), nose wear (NW) and depth of cut notching (DCN). Surprisingly, despite the lower fracture toughness of the materials in accordance with the present invention (i.e.

Z>1) there was no problem with tool breakage in this test.

The significant benefit that the present invention has on the high speed machining of high temperature alloys is further indicated by the following examples, which are intended to be purely illustrative of the present invention.

Cutting inserts of the style SNGN-453 (SNGN 12 07 12) having Z values of about 1.5, 2.0 and 2.5 were manufactured using the following techniques. The following description is for the Z=2.0 composition. The other compositions were made in a similar manner, except that the starting mix was appropriately varied to obtain the desired Z value.

The starting materials, in the proportions shown in Table I, were milled for 72 hours to obtain a BET surface area of 14–16 m$^2$/g and a particle size range in which at least 90% of the powder was less than 0.9 $\mu$m. After milling, the powders were dried, pelletized with 6.5 w/o of lubricant/binder and then uniaxially cold pressed to form green inserts of the desired geometry. The green inserts were then delubed and then sintered using a suitable setting powder at 1720° to 1800° C. for 100 minutes under 1 atmosphere of nitrogen.

TABLE I

| Material | Particle Size 90%< ($\mu$m) | Nominal Wt. % | Surface Area (BET) m$^2$/g |
|---|---|---|---|
| Si$_3$N$_4$ Grade SN-E10 | 1.4 | 63.35 | 10–12 |
| AlN Grade C | 2.6 | 9.26 | 5 |
| Al$_2$O$_3$ Grade Ceralox HPA 0.5 | 1.6 | 22.68 | 10 |
| Y$_2$O$_3$ Grade "fine" | 2.5 | 4.7 | 10–16 |

Grade SN-E10 Si$_3$N$_4$ powder is available from Ube Industries, Ltd., of Tokyo, Japan. This powder is equi-axed, has a mean particle size of about 0.2 $\mu$m, and is approximately 100 percent crystalline, with greater than 95 percent being alpha silicon nitride and the remainder, if any, is beta silicon nitride. The composition of grade SN-E10 silicon nitride is (in w/o): N>38.0; O<2.0; C<0.2; Cl<100 ppm; Fe<100 ppm; Ca<50 ppm; Al<50 ppm; and the remainder Si.

Grade C AlN is available from Herman C. Starck, Inc., New York, N.Y. This powder has a hexagonal, B4 single phase crystal structure. The composition of Grade C aluminum nitride is (in w/o): N$\geq$29.5; O$\leq$2.5; C$\leq$0.1; Fe$\leq$0.0005; other metallic impurities$\leq$0.01; and the remainder is aluminum.

Grade Ceralox HPA 0.5 is available from Ceralox Corporation of Tucson, Ariz. Ceralox HPA powder is a high purity alumina powder ($\geq$99.97% purity) having maximum impurities of (in ppm): Na-44; Si-93; Fe-21; Ca-21; and less than 1 to 5 ppm of each of the following: Mg, Cr, Cu, Mn, Li, Ga, K, Ni, Ti and Mo. In the Ceralox HPA 0.5 grade, 500 ppm of magnesia (MgO) has been added to the high purity alumina.

Fine grade Y$_2$O$_3$ is also available from Herman C. Starck, Inc. This powder is a high purity powder of at least 99.95% by weight Y$_2$O$_3$. The maximum weight percent of metallic impurities is 0.05.

After sintering, the typical properties of the Z=2 material are shown in Table II.

TABLE II

| | |
|---|---|
| Rockwell A Hardness | 93.3–93.7 |
| Vickers Hardness (VHN, 18.5 kg) GPa | 14.5–15.5 |
| K$_{Ic}$(E&C) MPam$^{\frac{1}{2}}$ | 4.6–5.7 |
| Density (g/cc) | 3.15–3.19 |
| Porosity | Essentially None |
| Transverse Rupture Strength Ksi | 70–120 |
| % of Sialon Beta Prime Sialon | 100% |
| Intergranular Glass Phase | $\approx$8–14% |
| Vickers Hardness at 1000° C. 1 kg (Kg/mm$^2$) | 1258 |

Figure 5:
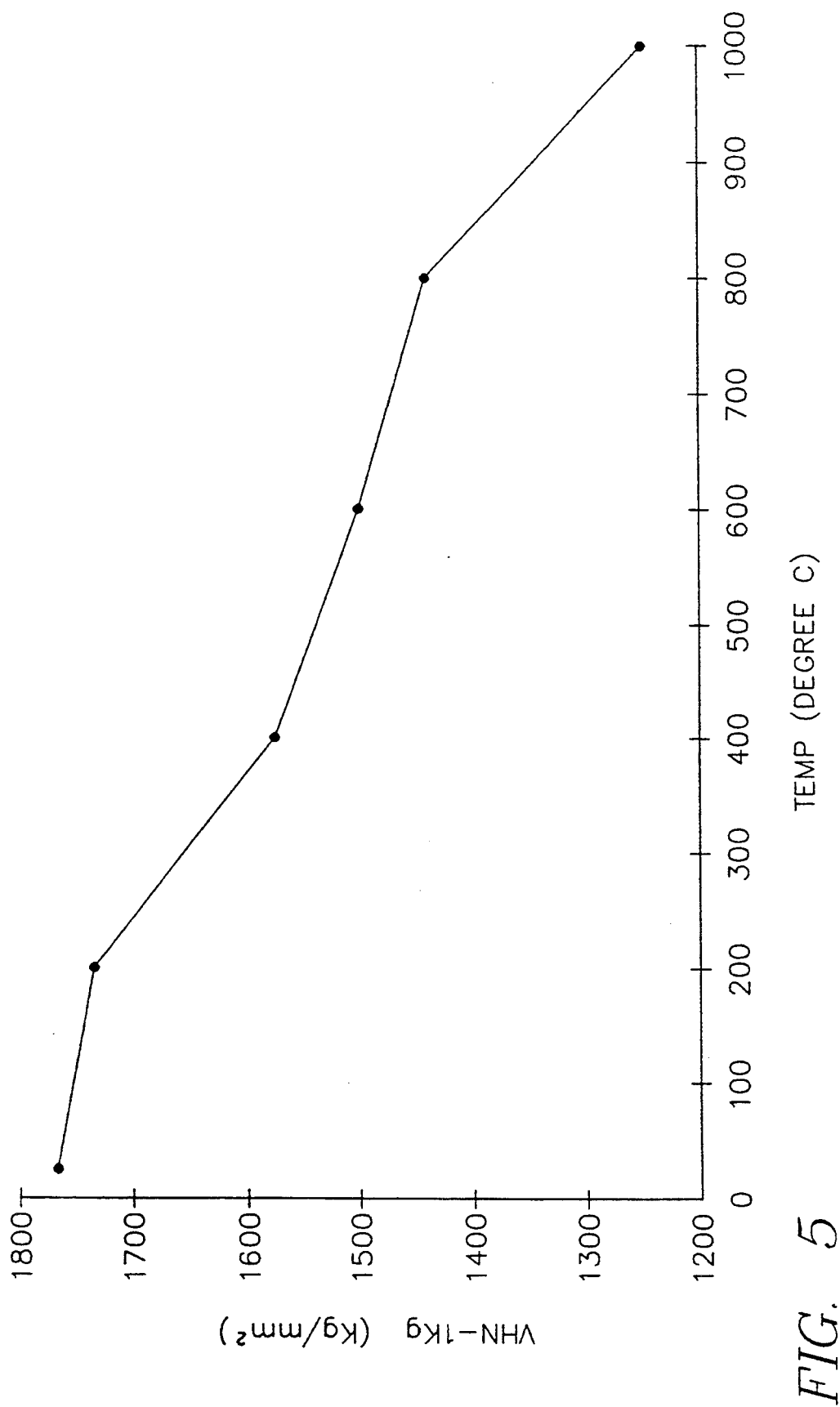
FIG. 5 shows the Vickers hardness (1 kg) in kg/mm² of an embodiment of the present invention as a function of temperature.

The room temperature and elevated temperature hardnesses obtained are shown in FIG. 5, and are similar to those obtained in sialon compositions having a Z value of less than 1. However, the elevated temperature hardness at 1000° C. is significantly greater than observed in a commercial grade of SiC whisker reinforced alumina cutting tool, which only had a hardness of about 950 kg/mm$^2$ at 1000° C.

Cutting inserts in accordance with the present invention having Z values of about 1.5, 2.0 and 2.5 were then tested under the conditions shown in Tables III, IV and V to determine their wear characteristics. Under the conditions described in Table III, the most rapid type of wear was maximum flank wear; however, it decreased as Z value increased from 1.5 to 2.5 (see FIG. 4). Under the conditions described in Table IV, flank wear, maximum flank wear and nose wear, all reached a minimum in the Z=2 material. Even in this material, depth of cut notching was only about one-half that observed in a commercial SiC whisker-reinforced material subjected to the same test conditions. In the Table V test, depth of cut notching was again the most rapid type of wear; however, as noted with respect to the Table IV test, it was less than that observed in a commercial SiC whisker-reinforced material subjected to the same test.

TABLE III

EFFECT OF Z VALUE ON WEAR RESISTANCE AT 5 MINUTES

| | Z = 1.5 | Z = 2 | Z = 2.5 |
|---|---|---|---|
| FLANK WEAR | .0230" (.584 mm) | .0250" (.635 mm) | .0223" (.566 mm) |
| MAXIMUM WEAR | .0306" (.777 mm) | .0299" (.760 mm) | .0281" (.714 mm) |
| NOSE WEAR | .0262" (.666 mm) | .0231" (.587 mm) | .0217" (.551 mm) |
| DEPTH-OF-CUT NOTCH | .0195" (.495 mm) | .0198" (.503 mm) | .0254" (.645 mm) |

| CUTTING CONDITIONS | |
|---|---|
| Workpiece: | Inconel 718 (34 HRC) |
| Speed: | 800 sfm (244 m/min.) |
| Feed: | .008 ipr (.203 mm/r) |
| DOC: | .06 in. (1.524 mm) |
| Lead Angle: | 45° |
| Insert: | SNGN 453 (SNGN 12 07 12) |
| Coolant: | Flood |
| Edge Prep: | .002"–.003" (.051–.076 mm) Hone |

TABLE IV

TOOL WEAR IN 9 MINUTES

| | Z = 1.5 | Z = 2 | Z = 2.5 |
|---|---|---|---|
| FLANK WEAR | .0118" (.300 mm) | .0106" (.269 mm) | .0128" (.325 mm) |
| MAXIMUM WEAR | .0138" (.351 mm) | .0128" (.325 mm) | .0142" (.361 mm) |
| NOSE WEAR | .0135" (.343 mm) | .0122" (.310 mm) | .0145" (.368 mm) |
| DEPTH-OF-CUT NOTCH | .0118" (.300 mm) | .0205" (.521 mm) | .0155" (.394 mm) |

TABLE IV-continued

CUTTING CONDITIONS

| | |
|---|---|
| Workpiece: | Inconel 718 (34 HRC) |
| Speed: | 400 sfm (122 m/min.) |
| Feed: | .012 ipr (.305 mm/r) |
| DOC: | .06 in. (1.524 mm) |
| Lead Angle: | 45° |
| Insert: | SNGN 453 (SNGN 12 07 12) |
| Coolant: | Flood |
| Edge Prep: | .002"-.003" (.051-.076 mm) Hone |

TABLE V

TOOL WEAR IN 10 MINUTES

| | INVENTION (Z ≈ 2.0) |
|---|---|
| FLANK WEAR | .0106" (.269 mm) |
| MAXIMUM WEAR | .0136" (.345 mm) |
| NOSE WEAR | .0239" (.607 mm) |
| DEPTH-OF-CUT NOTCH | .0458" (1.163 mm) |

CUTTING CONDITIONS

| | |
|---|---|
| Workpiece: | Inconel 718 (45 HRC) |
| Speed: | 400 sfm (122 m/min.) |
| Feed: | .008 ipr (.203 mm/r) |
| DOC: | .06 in. (1.524 mm) |
| Lead Angle: | 45° |
| Insert: | SNGN 453 (SNGN 12 07 12) |
| Coolant: | Flood |
| Edge Prep: | .002"-.003" (.051-.076 mm) Hone |

Figure 6:
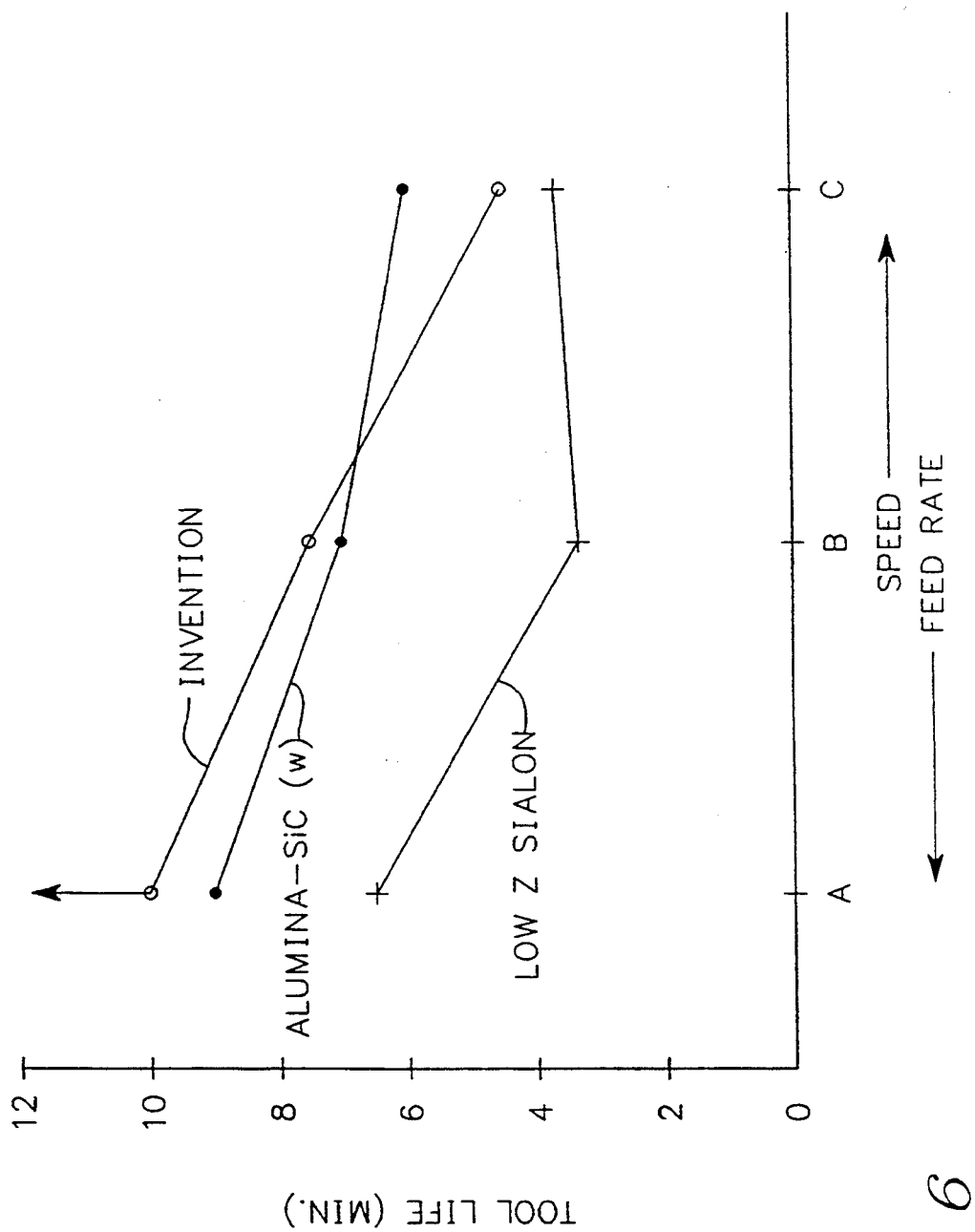
FIG. 6 is a graph of tool life in minutes as a function of machining speed, and feed rate for a substantially constant metal removal rate, in the high speed machining of Inconel 718.

In FIG. 6, the ceramic material according to the present invention (Z=2) was tested against a commercial grade of SiC whisker reinforced alumina and an alpha prime plus beta prime sialon (Z≈0.8) commonly used to machine Inconel 718. As shown in the figure, tool life was plotted against three machining conditions. Machining speed increased from left to right, while feed rate increased from right to left, and depth of cut was held constant, as shown below:

Condition A:
    800 sfm (244 m/min.)
    0.012 ipr (0.31 mm/rev.)
    0.060 inch DOC (1.52/min.)
Condition B:
    1000 sfm (305 m/min.)
    0.010 ipr (0.25 mm/rev.)
    0.060 inch DOC (1.52/min.)
Condition C:
    1200 sfm (366 m/min.)
    0.008 ipr (0.20 mm/rev.)
    0.060 inch DOC (1.52/min.)

The metal removal rate for each condition was substantially constant (A=B=6.9 in.$^3$/min.(113 cm$^3$/min); C=7.2 in.$^3$/min (118 cm$^3$/min)). The material machined was Inconel 718 having a Rockwell C hardness of 26. At speeds below 1200 sfm (366 m/min.), the present invention had the longer tool life than the whisker reinforced material. At 1200 sfm (366 m/min) the silicon carbide whisker reinforced alumina had the longer tool life. At 800 sfm (244 m/min.) the tool life of the present invention was greater than 10 minutes. Under all conditions tested, the present invention had better tool life than the low Z sialon material. In this test, the low Z sialon material failed due to flank wear; the silicon carbide whisker reinforced material failed due to depth of cut notching, a less predictable failure mechanism; and the material according to this invention failed due to nose wear.

These results clearly show that the present invention has improved wear resistance compared with prior sialon compositions, while surprisingly, at the same time having sufficient toughness in high speed machining of high temperature alloys to compete effectively against SiC whisker reinforced alumina materials in many of these applications. In machining applications, where silicon carbide whisker reinforced alumina has a longer tool life than the present invention, it is preferred that the machining speed be decreased and the feed rate increased. In this manner, the tool life of the present invention may be increased to be equal to, or better than, that of the silicon carbide whisker reinforced alumina, while substantially maintaining the same metal removal rate, as demonstrated by FIG. 6.

While not wishing to be bound by theory, the following theory is offered by way of explanation in an attempt to better understand the reasons for the surprising degree of toughness in machining discovered in the present invention despite its low $K_{Ic}$ fracture toughness.

The present invention, like low Z sialon metalcutting tools of the past, contains a needle-like beta prime grain structure (see FIG. 2). However, unlike the low Z sialons, it has a low $K_{Ic}$(E&C) fracture toughness, typically about 5.0 for Z≈2 (see Table VI); but, during machining of high temperature alloys, the reliability, or toughness in machining (i.e., resistance to breakage) of the present invention is between that of beta prime sialon having a Z value of about 0.4 and alpha prime plus beta prime sialon having a Z value of about 0.8 and better than that of silicon carbide whisker reinforced alumina. This surprising toughness in machining may be due to the thermal shock resistance of the material. For comparison purposes of one material to another, thermal shock resistance may be estimated by a thermal shock parameter, such as $K_{Ic}/E\alpha$ or $K_{Ic}k/E\alpha$. As shown in Table VI, the thermal shock parameter $K_{Ic}/E\alpha$ may be offered as a possible explanation of the surprising toughness in machining of the present invention, in that it is between that of the Z=0.4 and Z=0.8 sialons. This is due to Young's Modulus of the present invention being surprisingly lower than the value of this property in the low Z materials. The thermal expansion coefficient, α, for the present invention was not measured, but was assumed to be the same as that found in low Z sialons. As can be seen from Table VI, based on the above theory, the thermal shock resistance of the present invention appears to be better than that of silicon carbide whisker reinforced alumina.

TABLE VI

| Material | β' Sialon Z = .4 | α' + β' Sialon Z = .8 | Invention Z = 2 | Al$_2$O$_3$ + 30 v/o SiCw |
|---|---|---|---|---|
| $K_{Ic}$(E&C) (RT:MPam$^{\frac{1}{2}}$) | 6.5 | 6 | 5.0 | 6 |
| k (RT:W/m-K) | 27.2 | 11.7 | 6.7 | 35.4 |
| E (RT:GPa) | 303 | 303 | 245 | 392 |
| α (RT-500°C./°C.) | 3 × 10$^{-6}$ | 3 × 10$^{-6}$ | Est: 3 × 10$^{-6}$ | 5.8 × 10$^{-6}$ |
| $K_{Ic}/E\alpha$ | 7.2 × 10$^3$ | 6.6 × 10$^3$ | 6.8 × 10$^3$ | 2.6 × 10$^3$ |
| $K_{Ic}k/E\alpha$ | 19.5 × 10$^4$ | 7.7 × 10$^4$ | 4.6 × 10$^4$ | 9.3 × 10$^4$ |

$K_{Ic}$(E&C) fracture toughness
k thermal conductivity
E Young's Modulus determined by Ultrasonic technique
α thermal expansion coefficient
RT room temperature Preferred application ranges in turning nickel, iron and cobalt base high temperature alloys for the present invention are shown in Table VII.

TABLE VII

| Workpiece Material | Machining Conditions | Finishing | Roughing | Starting Conditions |
|---|---|---|---|---|
| Machining Conditions Based on a Hardness Range of 25-45 HRC | depth-of-cut (inch) | .010-.060 | .060-.500 | |
| | feed rate (ipr) | .001-.008 | .005-.018 | .008 |
| | surface speed (sfm) | 500-1200 | 300-800 | 750 |

Preferred application ranges in turning hardened steels and hardened cast irons, ductile irons and grey cast irons are shown in Table VIII.

TABLE VIII

| Workpiece Material | Machining Conditions | |
|---|---|---|
| Hardened Steels & Hardened Cast Irons | doc (inch) | .100 max preferably .06 max. |
| | feed rate (ipr) | .001-.010 |
| | surface speed (sfm) | 150-600 |
| Ductile Irons | doc (inch) | up to .250 |
| | feed rate (ipr) | .003-.018 |
| | surface speed (sfm) | 800-3000 |
| Grey Irons | doc (inch) | up to .250 |
| | feed rate (ipr) | .004-.035 |
| | surface speed (sfm) | 700-3500 |

In another alternative embodiment of the present invention, the ceramic cutting inserts as described before may be coated with a refractory coating for improved wear resistance in high speed machining. Conventional coating techniques used to coat cemented carbide or ceramic cutting tools may be used, such as chemical vapor deposition, to apply a 1-10 μm refractory coating containing one or more layers of refractory materials such as $Al_2O_3$, TiCN, and TiN alone or in combination. An $Al_2O_3$ or TiN layer, most preferably $Al_2O_3$, should preferably be applied directly to the substrate to assure the best adhesion between the coating and the substrate. In a preliminary test, a substrate in accordance with the present invention (100% Z=2 beta prime sialon and glass) was fabricated into an SNGN-453T (0.008"×20° chamfer) style cutting insert and coated by conventional CVD techniques first with a 1 μm thick layer of $Al_2O_3$ adjacent to the substrate, followed by 3 μm of TiCN, 2 μm of $Al_2O_3$ and finally 1 μm of TiN. The coated insert was then tested against the same material without a coating in the high speed dry turning of a Class 40 Grey cast iron at a speed of 2000 surface feet per minute, a feed rate of 0.015 inch per revolution, a depth of cut of 0.080 inch, a lead angle of 15 degrees. The uncoated material had an average tool life of 8.5 minutes, whereas the coated material surprisingly had an average tool life in excess of 17.5 minutes, more than double the average life of the uncoated tool. In addition, while the uncoated tool failed by breakage, the coated tool surprisingly failed by flank wear, or did not fail at all before the test was ended at 20 minutes of machining.

As used herein, $K_{Ic}(E\&C)$ is fracture toughness as measured on a polished surface employing the Palmqvist indentation technique using a 18.5 kg load on a Vickers indentor (see Evans and Charles, "Fracture Toughness Determination by Indentation," J. American Ceramic Society, Vol. 59, No. 7-8, Pages 371, 372).

All patents and other publications referred to herein are hereby incorporated by reference in their entireties.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A ceramic metalcutting insert for high speed chip forming machining of high temperature alloys comprising:
    a flank face;
    a rake face over which said chips, formed during said high speed machining of said high temperature alloys, flow;
    a cutting edge, formed at the juncture of said rake face and said flank face, for cutting into said high temperature alloys during said high speed chip forming machining of said high temperature alloys;
    said ceramic having sialon grains and an intergranular phase disposed between said sialon grains;
    wherein the sialon comprises at least 50 v/o of said ceramic;
    wherein said ceramic contains less than 1 v/o porosity;
    wherein at least 70 v/o of said sialon is beta prime sialon;
    and wherein said beta prime sialon has a Z value greater than 1.5, but less than 3.0.

2. The ceramic metalcutting insert according to claim 1 wherein said intergranular phase includes noncrystalline phase which forms about 5 to about 15 v/o of said ceramic.

3. A method of high speed chip forming machining of high temperature alloys comprising:
    removing material from the surface of said high temperature alloy by forming chips of said high temperature alloy by engaging said high temperature alloy at a high speed with a ceramic cutting insert;
    wherein said cutting insert having a flank face and a rake face and a cutting edge formed at the juncture of said rake face and said flank face;
    flowing said chips of said high temperature alloy across said rake face;
    wherein said ceramic cutting insert has sialon grains and intergranular phase wherein said intergranular phase is disposed between said sialon grains;
    wherein said sialon comprises at least 50 v/o of said ceramic;
    wherein said ceramic has less than 1 v/o porosity;
    wherein at least 70 v/o of said sialon is beta prime sialon and said intergranular phase forms 5 to 15 v/o of said ceramic;
    wherein said beta prime sialon has a Z value of greater than 1.5, but less than 3.0;
    and wherein said high speed is 300 to 1500 surface feet/minute.

4. The method according to claim 3 wherein said speed is 500 to 1200 surface feet/minute.

5. The method according to claim 3 wherein said speed is 300 to 800 surface feet/minute.

6. The method according to claim 4 wherein said removing of said material is performed at a feed rate of 0.001 to 0.008 inches/revolution.

7. The method according to claim 5 wherein said removing of said material is performed at a feed rate of 0.005 to 0.018 inches/revolution.

8. A ceramic metalcutting insert for high speed chip forming machining of high temperature alloys comprising:
   a flank face;
   a rake face over which said chips, formed during said high speed machining of said high temperature alloys, flow;
   a cutting edge, formed at the juncture of said rake face and said flank face, for cutting into said high temperature alloys during said high speed chip forming machining of said high temperature alloys;
   said ceramic having sialon grains and an intergranular phase disposed between said sialon grains;
   wherein said sialon comprises at least 50 v/o of said ceramic;
   wherein said ceramic has less than 1 v/o porosity;
   wherein said sialon consists of beta prime sialon;
   and wherein said beta prime sialon has a theoretical Z value of greater than 1.5, but less than 3.0.

9. The ceramic metalcutting tool according to claim 8 wherein said intergranular phase is a glass and forms about 5 to 15 v/o of said ceramic.

10. The ceramic metalcutting tool according to claim 8 wherein said ceramic has a $K_{Ic}$ fracture toughness of greater than 4.0, but less than 6.0 MPam$^{\frac{1}{2}}$.

11. The ceramic metalcutting tool according to claim 8 wherein the Young's Modules is less than 285 GPa.

12. A ceramic metalcutting insert for high speed chip forming machining of high temperature alloys comprising:
   a flank face;
   a rake face over which said chips, formed during said high speed machining of said high temperature alloys, flow;
   a cutting edge, formed at the juncture of said rake face and said flank face, for cutting into said high temperature alloys during said high speed chip forming machining of said high temperature alloys;
   said ceramic having sialon grains and at least one intergranular phase disposed between said sialon grains;
   wherein said sialon comprises at least 50 v/o of said ceramic;
   wherein said ceramic has less than 1 v/o porosity;
   wherein said sialon consists of beta prime sialon and up to 30 v/o alpha prime sialon;
   and wherein said beta prime sialon has a Z value of greater than 1.5, but less than 3.0.

13. The ceramic cutting tool according to claim 12 wherein said intergranular phase is glass and forms about 5 to 15 v/o of said ceramic.

14. The ceramic cutting tool according to claim 12 wherein said intergranular phase is glass and forms about 5 to 15 v/o of said ceramic.

15. The ceramic metalcutting insert according to claim 8 wherein said ceramic further having a hard refractory phase.

16. The ceramic metalcutting insert according to claim 15 wherein said hard refractory phase forms no greater than 30 v/o of said ceramic.

17. The ceramic metalcutting insert according to claim 16 wherein said hard refractory phase is a carbide, nitride, carbonitride of Ti, Zr, Hf and their alloys with each other, alone or in combination.

18. The ceramic metalcutting insert according to claim 17 Wherein said hard refractory phase is titanium nitride.

19. The ceramic metalcutting insert according to claim 12 wherein said ceramic further having a hard refractory phase.

20. The ceramic metalcutting insert according to claim 19 wherein said hard refractory phase forms no greater than 30 v/o of said ceramic.

21. The ceramic metalcutting insert according to claim 20 wherein said hard refractory phase is a carbide, nitride, carbonitride of Ti, Zr, Hf and their alloys with each other, alone or in combination.

22. The ceramic metalcutting insert according to claim 21 wherein said hard refractory phase is titanium nitride.

23. A ceramic material comprising:
   sialon grains and an intergranular phase disposed between said sialon grains;
   wherein sialon forms at least 50 v/o of said ceramic;
   wherein at least 70 v/o of said sialon is beta prime sialon;
   wherein said ceramic contains less than 1 v/o porosity;
   wherein said beta prime sialon has a Z value between 1.5 and 3;
   and wherein said ceramic has a Young's Modulus of less than 285 GPa.

24. The ceramic material according to claim 23 wherein said Young's Modules is less than 270.

25. The ceramic material according to claim 23 having a $K_{Ic}$ fracture toughness between 4.0 and 6.0 MPam$^{\frac{1}{2}}$.

26. The ceramic material according to claim 23 having a $K_{Ic}$ fracture toughness between 4.6 and 5.7 MPam$^{\frac{1}{2}}$.

27. The ceramic material according to claim 24 having a $K_{Ic}$ fracture toughness between 4.6 and 5.7 MPam$^{\frac{1}{2}}$.

28. A ceramic metalcutting insert for high speed chip forming machining of a cast irons comprising:
   a flank face;
   a rake face over which said chips, formed during said high speed machining of said cast irons, flow;
   a cutting edge, formed at the juncture of said rake face and said flank face, for cutting into said cast irons during said high speed chip forming machining of said cast irons;
   said ceramic having sialon grains and an intergranular phase disposed between said sialon grains;
   wherein the sialon comprises at least 50 v/o of said ceramic;
   wherein said ceramic contains less than 1 v/o porosity;
   wherein at least 70 v/o of said sialon is beta prime sialon;
   and wherein said beta prime sialon has a Z value greater than 1.5, but less than 3.0.

29. A method of high speed chip forming machining of a cast iron comprising:
   removing material from the surface of said cast iron by forming chips of said cast iron by engaging said cast iron at a high speed with a ceramic cutting insert;
   wherein said cutting insert having a flank face and a rake face and a cutting edge formed at the juncture of said rake face and said flank face;

flowing said chips of said cast iron across said rake face;
wherein said ceramic cutting insert has sialon grains and intergranular phase wherein said intergranular phase is disposed between said sialon grains;
wherein said sialon comprises at least 50 v/o of said ceramic;
wherein said ceramic has less than 1 v/o porosity;
wherein at least 70 v/o of said sialon is beta prime sialon and said intergranular phase forms 5 to 15 v/o of said ceramic;
wherein said beta prime sialon has a Z value of greater than 1.5, but less than 3.0;
and wherein said high speed is 700 to 3500 surface feet/minute.

30. A ceramic metalcutting insert for chip forming machining of hardened steels and hardened cast irons comprising:
a flank face;
a rake face over which said chips, formed during said machining of said hardened steels and hardened cast irons, flow;
a cutting edge, formed at the juncture of said rake face and said flank face, for cutting into said hardened steels and hardened cast irons during said chip forming machining of said hardened steels and hardened cast irons;
said ceramic having sialon grains and an intergranular phase disposed between said sialon grains;
wherein the sialon comprises at least 50 v/o of said ceramic;
wherein said ceramic contains less than 1 v/o porosity;
wherein at least 70 v/o of said sialon is beta prime sialon;
and wherein said beta prime sialon has a Z value greater than 1.55, but less than 3.0.

31. A method of chip forming machining of hardened steel and hardened cast iron comprising:
removing material from the surface of said hardened steel or hardened cast iron by forming chips of said hardened steel or hardened cast iron by engaging said hardened steel or hardened cast iron at a predetermined speed with a ceramic cutting insert;
wherein said cutting insert having a flank face and a rake face and a cutting edge formed at the juncture of said rake face and said flank face;
flowing said chips of said hardened steel or hardened cast iron across said rake face;
wherein said ceramic cutting insert has sialon grains and intergranular phase wherein said intergranular phase is disposed between said sialon grains;
wherein said sialon comprises at least 50 v/o of said ceramic;
wherein said ceramic has less than 1 v/o porosity;
wherein at least 70 v/o of said sialon is beta prime sialon and said intergranular phase forms 5 to 15 v/o of said ceramic;
wherein said beta prime sialon has a Z value of greater than 1.5, but less than 3.0;
and wherein said speed is 150 to 600 surface feet/minute.

32. The ceramic metalcutting insert according to claim 1 wherein said Z value is greater than 1.7, but no greater than 2.5.

33. The method according to claim 3 wherein said Z value is greater than 1.7, but no greater than 2.5.

34. The ceramic material according to claim 8 wherein said Z value is greater than 1.7, but no greater than 2.5.

35. The ceramic material according to claim 23 wherein said Z value is greater than 1.7, but no greater than 2.5.

36. The ceramic metalcutting insert according to claim 24 wherein said Z value is greater than 1.7, but no greater than 2.5.

37. The ceramic metalcutting insert according to claim 28 wherein said Z value is greater than 1.7, but no greater than 2.5.

38. The method according to claim 29 wherein said Z value is greater than 1.7, but no greater than 2.5.

39. The ceramic metalcutting insert according to claim 30 wherein said Z value is greater than 1.7, but no greater than 2.5.

40. The method according to claim 31 wherein said Z value is greater than 1.7, but no greater than 2.5.

41. The ceramic material according to claim 23 wherein said Z value is no greater than 2.3.

42. The ceramic material according to claim 24 wherein said Z value is greater than 1.7, but no greater than 2.3.

43. The ceramic metalcutting insert according to claim 1 further comprising a refractory coating on said ceramic.

44. The ceramic metalcutting insert according to claim 8 further comprising a refractory coating on said ceramic.

45. The ceramic metalcutting insert according to claim 12 further comprising a refractory coating on said ceramic.

46. The ceramic material according to claim 23 further comprising a refractory coating on said ceramic.

47. The ceramic material according to claim 24 further comprising a refractory coating on said ceramic.

48. The ceramic material according to claim 25 further comprising a refractory coating on said ceramic.

49. The ceramic material according to claim 27 further comprising a refractory coating on said ceramic.

50. The ceramic metalcutting insert according to claim 28 further comprising a refractory coating on said ceramic.

51. The method according to claim 29 further comprising a refractory coating on said ceramic.

52. The ceramic material according to claim 41 further comprising a refractory coating on said ceramic.

53. The ceramic material according to claim 42 further comprising a refractory coating on said ceramic.

54. The ceramic metalcutting insert according to claim 1 wherein: said ceramic consists essentially of sialon and intergranular phase; said beta prime sialon forms at least 85 v/o of said sialon; said ceramic has a $K_{Ic}$ fracture toughness of greater than 4.0 but less than 6.0 MPam$^{\frac{1}{2}}$; and said ceramic has a Young's Modulus of less than 285 GPa.

55. The ceramic metalcutting insert according to claim 54 wherein said fracture toughness is less than 5.7 MPam$^{\frac{1}{2}}$.

56. The ceramic metalcutting insert according to claim 54 wherein said Young's Modulus is less than 270 GPa.

57. The ceramic metalcutting insert according to claim 55 wherein said Young's Modulus is less than 270 GPa.

58. The ceramic material according to claim 54 consisting essentially of sialon and intergranular phase and wherein said beta prime sialon forms 100 v/o of said sialon.

59. The ceramic material according to claim 24 consisting essentially of sialon and intergranular phase and wherein said beta prime sialon forms at least 85 v/o of said sialon.

60. The ceramic material according to claim 25 consisting essentially of sialon and intergranular phase and wherein said beta prime sialon forms at least 85 v/o of said sialon.

61. The ceramic material according to claim 26 consisting essentially of sialon and intergranular phase and wherein said beta prime sialon forms at least 85 v/o of said sialon.

62. The ceramic material according to claim 27 consisting essentially of sialon and intergranular phase and wherein said beta prime sialon forms at least 85 v/o of said sialon.

63. The ceramic material according to claim 24 consisting essentially of sialon and intergranular phase; wherein said beta prime sialon forms 100% of said sialon; and having a $K_{Ic}$ fracture toughness of between 4.0 and 6.0.

* * * * *